United States Patent
Hoshino et al.

(10) Patent No.: US 7,590,239 B2
(45) Date of Patent: Sep. 15, 2009

(54) OBJECT IDENTIFYING MEDIUM USING MULTI-LAYER THIN-FILM

(75) Inventors: Hidekazu Hoshino, Yokohama (JP); Itsuo Takeuchi, Yokohama (JP); Mutsumi Sasaki, Yokohama (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 807 days.

(21) Appl. No.: 10/527,446

(22) PCT Filed: Sep. 12, 2003

(86) PCT No.: PCT/JP03/11716

§ 371 (c)(1), (2), (4) Date: Mar. 11, 2005

(87) PCT Pub. No.: WO2004/024439

PCT Pub. Date: Mar. 25, 2004

(65) Prior Publication Data

US 2006/0023879 A1 Feb. 2, 2006

(30) Foreign Application Priority Data

Sep. 13, 2002 (JP) ............................. 2002-269163

(51) Int. Cl.
*G09C 3/00* (2006.01)
*G03H 1/00* (2006.01)

(52) U.S. Cl. ............................................ 380/54; 359/1
(58) Field of Classification Search .................... 380/54; 359/1
See application file for complete search history.

(56) References Cited

U.S. PATENT DOCUMENTS

| 5,005,719 | A | * | 4/1991 | Phillips et al. ............... 215/230 |
| RE38,321 | E | * | 11/2003 | Uyama et al. ............... 428/212 |
| 6,641,874 | B2 | * | 11/2003 | Kuntz et al. .................. 428/29 |
| 2002/0015836 | A1 | | 2/2002 | Jonza et al. |

FOREIGN PATENT DOCUMENTS

| EP | 1 031 408 A2 | 8/2000 |
| EP | 1132450 A2 | 9/2001 |
| JP | A 07-144500 | 6/1995 |
| JP | A-09-156198 | 6/1997 |
| JP | U 9-536 | 11/1997 |
| JP | A 10-100573 | 4/1998 |
| JP | A 10-140500 | 5/1998 |
| JP | A 10/237799 | 9/1998 |
| JP | Y2 2590068 | 11/1998 |
| JP | B2 2915869 | 4/1999 |
| JP | A 11-224050 | 8/1999 |

(Continued)

*Primary Examiner*—Kambiz Zand
*Assistant Examiner*—Stephen Sanders
(74) *Attorney, Agent, or Firm*—Oliff & Berridge, PLC

(57) ABSTRACT

A discrimination medium for objects by which counterfeiting can be prevented, authenticity of the article can be easily and reliably determined, and the production cost can be reduced is provided. In the discrimination medium, the support body 31 and the pattern 20 appear to be the same color when viewed from a specific angle (for instance, viewing from the front). On the other hand, when the viewing angle is increased, the color of the pattern 20 composed of a multilayer thin film changes by color shift, whereby the pattern 20 becomes a color different from the support body 31.

10 Claims, 9 Drawing Sheets

FOREIGN PATENT DOCUMENTS

| | | |
|---|---|---|
| JP | B2 3013852 | 12/1999 |
| JP | A 2000-6564 | 1/2000 |
| JP | A-2000-064198 | 2/2000 |
| JP | A-2000-112357 | 4/2000 |
| JP | A 2000-141567 | 5/2000 |
| JP | A-2000-284673 | 10/2000 |
| JP | A-2000-290896 | 10/2000 |
| JP | A 2000-326467 | 11/2000 |
| JP | B2 3244278 | 10/2001 |
| JP | A 2001-315243 | 11/2001 |
| JP | A 2001-353971 | 12/2001 |
| JP | 2002-529288 A | 9/2002 |
| WO | WO 99/36257 | 7/1999 |
| WO | WO 00/29212 A1 | 5/2000 |
| WO | WO 02/095456 A2 | 11/2002 |

* cited by examiner

OBJECT IDENTIFYING MEDIUM USING MULTI-LAYER THIN-FILM

TECHNICAL FIELD

The present invention relates to a discrimination medium for determining whether flat articles such as packages in which goods are packed, passports, cards, bills, bond certificates, security notes, gift certificates, pictures, tickets, lottery tickets, etc., are authentic, and for determining, whether various kinds of three-dimensional article are authentic.

BACKGROUND ART

Conventionally, for example, a technique of pasting a hologram on a surface of an article or a technique of applying a special ink on a surface of an article have been known as methods to stop counterfeiting of articles such as cards and security notes. (for example, Japanese Utility Model Application Laid-Open No. 2001-315243, page 2, claim 14). In a technique in which the hologram is used, the authenticity of the article on which the hologram is pasted is determined by viewing the hologram, which appears to be three-dimensional or varies in color depending on the viewing angle. In a technique in which a special ink is used, for example fluorescent ink or magnetic ink may be used as the special ink. The authenticity of the article on which the above ink is applied is determined by sensing information hidden in the above ink by irradiating ultraviolet light thereon or by magnetic sensors although the above ink may be viewed in the same manner as normal inks. Moreover, examples using an ink or a film made from cholesteric liquid crystal are well known as an identifying medium for objects such as cards and security notes for an anti counterfeiting method using a film in which the reflective characteristics of light depends on the viewing and the light is selectively reflected (for example, Japanese Patent No. 3244278, page 7, and FIGS. 1 and 2).

However, if it is desired to obtain high performance of identification only using holograms, high cost technology is required to the holograms, and the holograms cannot be used on some kinds of objects. In addition, counterfeiting is easy since inks similar to the fluorescent ink and the magnetic ink can be easily obtained, and an apparatus for confirming is large and requires a power supply, whereby use there of is inconvenient. Moreover, the production cost for the identifying medium for objects is high since the price of the cholesteric liquid crystal used therein is relatively high, and the medium is not suitable for low-price goods.

Therefore, an object of the present invention is to provide a discrimination medium by which counterfeiting can be prevented, authenticity of articles can be easily and reliably determined, and the production cost can be low.

DISCLOSURE OF THE INVENTION

The present invention provides a discrimination medium for determining authenticity of an object by providing an optical discriminating mark on the object, the medium including a support body, and a multilayer thin film fixed to a part of the support body and having light selectivity of reflecting characteristics depending on viewing angle.

The present invention further provides a discrimination medium, for determining authenticity of an object by providing an optical discriminating mark on the object, the medium including a multilayer thin film having selectivity in light reflecting depending on viewing angle, and a masking sheet fixed to a surface of the multilayer thin film for masking a part of the surface.

First, the basic principles of the invention will be explained hereinafter. FIG. 1 shows a condition in which incident light is emitted onto the multilayer thin film. When white light is emitted onto the multilayer thin film, the light is reflected, absorbed and passes through. In particular, the reflected light interferes according to optical path difference of the reflection in each layer, and has characteristics in which only light having wavelengths in a specific wavelength range is reflected. This effect is called the selective reflection effect. The reflected wavelength and the reflectance can be obtained by the following formula.

$$\lambda = 2 \times (nA \cdot dA \cdot \cos\theta + nB \cdot dB \cdot \cos\theta)$$

$$R = (nA/nB - 1)^2 / (nA/nB + 1)^2$$

Wherein, $\lambda$ is wave length of reflected light, nA is refractive index of layer A, nB is refractive index of layer B, $\theta$ is reflection angle, dA is membrane thickness of layer A, dB is thickness of layer B, and R is reflectance.

The selective reflection wavelength range can be optionally set according to the refractive index of the material such as polymers, composing the layer thickness of the layer, and the numbers of layers, and such an effect is obtained for the following reasons. That is, FIG. 2 shows the conditions in which light having a specific wavelength is selectively reflected.

As is clear from the above formula, the multilayer thin film has the specific feature in that the color changes according to the viewing angle, light selectivity of reflecting depending on the angle of the incident light, the thickness of layer (dA) and (dB) decreases when viewed. Therefore the wavelength $\lambda$ of the main reflective light is shifted to the short wavelength side. This phenomenon can also be explained as follows. That is to say, an incident light is reflected on each boundary surface of a multilayer thin film according to the difference of a refractive index, and the reflected light interferes according to the optical path difference. The optical path difference is short as the light is emitted into the boundary surface at an incident light angle approximate by to parallel to the boundary surface, and is reflected thereon. Therefore, the wavelength in which light interferes and reinforces is shifted to the short wavelength side as the multilayer thin film is viewed at an angle approximately parallel to the surface, whereby there is an optical path difference between the light reflected at each boundary surface. According to this principle, the condition in which the light exhibited interference and reinforcing and shifted to the short wavelength side can be observed when the viewing angle is gradually inclined from the viewing angle perpendicular to the multilayer thin film.

For example, as the viewing angle is increased (the multilayer thin film is inclined), the color of reflected light of the multilayer thin film which is visible in red when perpendicular incident light is observed (viewed from the front) changes (color shift) to orange, yellow, bluish green, and blue. Therefore, when the discrimination medium secured with a multilayer thin film which shows light selectivity of reflecting depending on viewing angle is adhered to a part of the support body, the authenticity can be easily determined by observing the color variation. Moreover, where a masking sheet is fixed to a surface of the multilayer thin film which shows light selectivity of reflecting depending viewing angle can be easily determined by observing the color change. Moreover, authenticity can be easily determined by the effect of color shift of the multilayer thin film without adhering the masking sheet. It should be noted that the viewing angle is defined as an angle of the line of sight with respect to a line perpendicular to the observed surface. For example, when the object is observed from the front, the perpendicular line is considered to be the line of sight and the viewing angle is 0 degrees. When the object is observed with an angle approximately parallel to the surface, the viewing angle is larger (approximate 90 degrees).

In the present invention, a portion is formed by printing or foil transfer, and the portion exhibits a color equivalent to the color of the medium further including the multilayer thin film viewed from a specific direction. According to this embodiment, when the discrimination medium is viewed from a specific angle (for example, from the front), since the color of a film is equivalent to that of the surrounding portion, the boundary there of is not clear. On the other hand, although the color of the multilayer thin film changes with the color shift of a multilayer thin film while changing the view angle (for example, when the angle is increased), the surrounding portion does not change. For this reason, a multilayer thin film gradually conspicuously appears in the surrounding portion. Therefore, anyone can authenticate the discrimination medium simply and certainly by visual observation.

Furthermore, in a structure which fixes a masking sheet to the surface of a multilayer thin film, it is preferable to dispose foil to a part of the multilayer thin film by foil transfer. In this invention, other materials, such as paper, plastic sheets, and paint for printing can be used in addition to the foil. In this embodiment, effects the same as the above can be obtained by using the masking sheet with a color equivalent to the color when the multilayer thin film is viewed from a specific angle (for example, from the front). Since the gloss of a multilayer thin film and the gloss of a foil are similar, particularly when foil is used as a masking sheet, change in the color of a surrounding multilayer thin film can give a dramatic impression.

There are various kinds of methods as methods for fixing to a supporter the multilayer thin film which has the above characteristics. As these methods, there are methods of fixing with adhesive, methods of fixing by heat transfer, methods of mixing at the time of manufacture of a support body or an object, etc. According to circumstances, a support body may be the object itself. Since the multilayer thin film can be easily worked, it is possible to cut it into strips, or to break it into fragments. When multilayer thin film is cut into strips or fibers, they are held between the support bodies divided into two layers. In this case, the opening is formed in the one or more layers of the support body which is divided into two layers. This opening is for recognizing the multilayer thin film. When the support body is paper, the multilayer thin film which is in the shape of a strip, the shape of a fiber, and the shape of a fragment can be fixed on a support body in paper making.

In this case, although the multilayer thin film is not completely exposed to the surface visibility is not decreased since the luminosity of the multilayer thin film is high compared to the reflection of surrounding portions.

Moreover, the structure which sandwiched the optical absorption layer between the first and second multilayer thin film is preferable. According to this embodiment, the color shifting characteristic is shown on both sides of the structure. Therefore, when the structure is worked into strips or fibers, even if the structure has twists or is folded back on itself, the function of the color shifting is not lost. Moreover, even if the structure is worked into chips and dispersed over a specific portion, front or near surfaces thereof are not problems since the optical characteristic save exhibited on both sides of the structure.

It should be noted that the optical absorption layer consists of a material which absorbs visible light. For example, a resin material which is black or of a dark deep color can be used as the optical absorption layer. Moreover, paint or an adhesive which is added to a pigment which is black or of a dark color and is cured can be used as an optical absorption layer.

It is more preferable that one of the surfaces (preferably the surface facing the object side) of a multilayer thin film be subjected to hologram processing or press processing. Counterfeiting is very difficult if the optical effects of the multilayer thin film and the hologram or press processing are used simultaneously. It should be noted that the hologram is formed by embossing characters or patterns, etc. In the hologram, the light reflected and diffracted on the embossed surface is refracted on the multilayer thin film, whereby the character or the pattern, seems to float above the surface. The character or the pattern formed by the hologram also can appear to be floating by observing the light refracted and diffracted on the multilayer thin film through the embossed surface. In such an embodiment, multiple effects of the hologram and the multilayer thin film can be obtained.

A hologram processing or a press processing can be directly preformed on the multilayer thin film in which a color shift is exhibited. However, when the quality of the material and structure are chosen so that color shift may be generating more clearly, neither a hologram processing nor a press processing may be able to be performed effectively due to the following reasons. First, when the materials in which color shift is clearly generated are selected, transformation of the materials caused by the embossing and a press forming is restored by the elasticity of the materials. Secondly, in the working, a slight misalignment occurs between layers in a multilayered structure, whereby the working accuracy of the embossing and the press forming is decreased.

A hologram forming or a press forming is made to the multilayer thin film. In such an embodiment, good function of color shift can be obtained, and intended embossing and press forming can be performed. The film having quality suitable for the embossing and the press forming) may be one layer or two layers or more. As the materials suitable for embossing and press forming, thermosetting resins, ionization radiation hardening resins, ultraviolet light hardening resins, etc. may be mentioned. For example, unsaturated polyester resin, acrylic denaturation urethane resin, an epoxy denaturation acrylic resin, etc. may be mentioned as thermosetting resins. Such materials have qualities that the lines of the embossing and the press forming can be clear. The layer suitable for embossing and press forming may be a layer which is formed by spraying coating, transfer, and printing. According to this embodiment, the structure which performs the maximum function of both optical characteristics of color shift and hologram can be obtained.

The following are examples of the manufacturing method of the above embodiment. First, a starting material for generating color shift and starting material for performing embossing and press forming (working layer) are layered. Next, a multilayer thin film is obtained by drawing the layered material. Then, embossing is performed on the multilayer thin film. The following examples can be mentioned as other manufacturing methods. First, the portion of the multilayer thin film for generating color shift is formed with drawing technology, then a working layer to be subjected to embossing and press forming is formed at least one of the front and rear surfaces of the multilayer thin film by spraying, coating, transfer, and printing. Embossing or press forming is performed by the above process. Thus, the multilayer thin film in which color shift can be shown and embossing or press forming was performed can be obtained.

In the above embodiment, since there is a difference between the refractive index of the working layer suitable for embossing and press forming and the refractive index of the multilayer thin film for generating color shift, the incident light is reflected at the boundary surface between the two layers. Therefore, the working layer is functionally a part of the multilayer thin film which generates color shift.

A transparent thin film layer (for instance, ZnS and $TiO_2$) having a refractive index different from that of the working layer may be formed on the embossing surface by deposition, or the like, the reflection and diffraction on the embossed surface.

In the invention, the discrimination medium has an adhesive layer to adhere the medium to the object, and the adhesive layer includes a pigment or dye having a color including black. The surface of the discrimination medium facing the object is printed with a color including black. According to such an embodiment the brightness of the multilayer thin film is increased and the visibility thereof is improved, whereby counterfeit articles can be much more easily distinguished from genuine articles.

When the multilayer thin film is mixed into a support, it can be visually recognized clearly.

A fluorescent material layer or a light accumulating material layer is held between a part of the discrimination medium and a part of the adhesive layer or between a part of the discrimination medium and a part of the printed layer. In the discrimination medium of this structure, in the state of irradiating normal light, a fluorescent material layer or a layer of the light accumulating material looks white, and only the metallic luster of the multilayer thin film is conspicuous.

On the other hand, if a black light or a germicidal light (light with a wavelength of 240 to 400 nm) is irradiated, the multilayer thin film will not react in the fluorescent material layer or the layer of the glowing material emits a strong light, which has a color depending on the kind of fluorescent material or the layer of the light accumulating material. The fluorescent material layer or the layer of the light accumulating material exhibits the same effect, even if it is merely inserted between an adhesion layer and a multilayer thin film. Such function can be used to confirm authenticity using the black light or the germicidal light.

In the invention, a slit is partially formed in the discrimination medium. For example, a support is layered with a separator paper via an adhesion layer. Then, the support and the adhesion layer are half cut with a die to from a slit. In this case, all portions other than the separator paper is cut, the adhesion layer is combined again, whereby only the support is cut and divided and is remained on the separator paper. If the support is peeled from an object after the discrimination medium having the slit is adhered to the object, the support will break apart since the peeling force acts on a part of the support and the adhesive force acts on other portions of the support.

According to this embodiment, it is impossible to reuse the discrimination medium by peeling it off from a disposed package and adhering it to counterfeit goods. In this case, a slit can be provided not only in a support but also in a multi-layer thin film.

In the invention, it is preferable to use a multilayer thin film which was produced by layering a starting material of thin films and drawing the layered structure. In order to obtain color shifting, it is necessary to control the thickness of one layer to be within about 0.05 to 0.3 μm. If such a thin film is produced with a single layer, it is required to use a technique with high production cost to obtain uniformity of the layer. In the technique in which films having a thickness of a certain extent are multilayered and the multilayer is drawn to a predetermined thickness, the problem of the uniformity can be solved.

Specifically, in a single layer or in a few layers, amount of reflected light is insufficient. Therefore, in order to obtain color shifting observable a multilayer structure with many layers is required, and the layering and drawing method in which a multilayer is drawn is advantageous. When drawing is performed adhesion between layers can be improved, and a highly integrated multilayer thin film can be obtained. Moreover, the refractive index can be changed positively or negatively by selecting the material and drawing it. By using this phenomenon, a multilayer thin film consisting of plural films and having a refractive-index difference suitable for the color shifting can be obtained.

It should be noted that there is a method by vacuum evaporation as a method of producing the thin film in which thickness is controlled. However, this method requires setting a material in a vacuum evaporation apparatus with the frequency of the number of the layers. Therefore the method requires much labor and is not preferable for mass-production and production cost compared to the layering and drawing method.

BEST MODE FOR CARRYING OUT THE INVENTION

Figure 1:
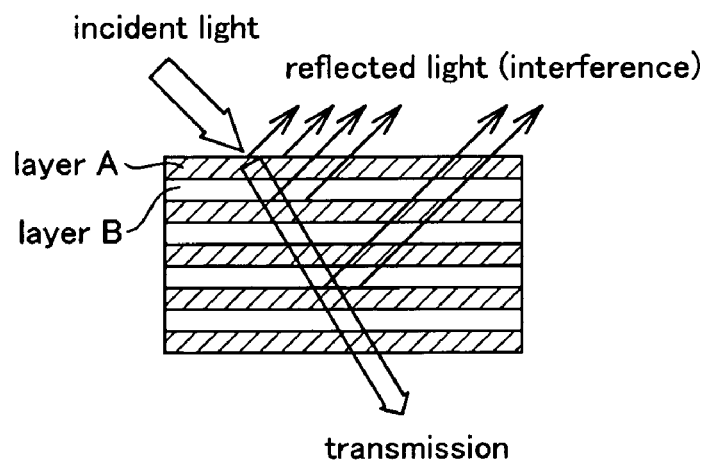
FIG. 1 is a sectional view showing the multilayer thin film for explaining the principle of this invention.
Figure 2:
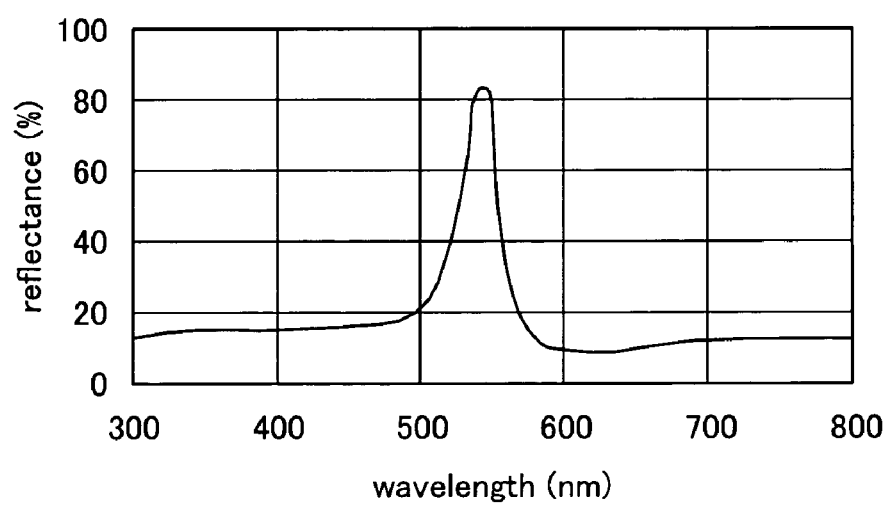
FIG. 2 is a diagram showing selective reflection of the multilayer thin film for explaining the principle of this invention.

Embodiments of the invention will be explained hereinafter.

A multilayer thin film can be produced by the well-known method disclosed in Japanese Patent Application First Publications No. 2000-141567 and No. 2000-326467. For instance, a layer composed of polyethylene-2,6-naphthalate containing inert particles such as silica, alumina, and calcium carbonate with an average particle size at 0.001 to 0.5 weight percent, and B composed of copolyethyleneterephthalate with a melting point of 210 to 245 degrees Celsius are alternately layered to at least 11 layers. Thus, a layered body whose difference in glass transition points (Tg) in an A layer and B layer is 40 degrees Celsius or more is obtained. Then, the layered body is drawn in the direction of one axis, such that the thickness of the A layer and the B layer is in a range of 0.05 to 0.3 μm.

According to another example, the A layer, composed of polyethylene-2,6-naphthalate and the B layer, composed of 12 mole % copolymerized polyethylene terephthalate of isophthalic acid are prepared, and 101 sheets of the A layer and 100 sheets of the B layer are alternately layered whereby an undrawn sheet with 201 layers is obtained. The sheet is drawn by 3.5 times its length in the longitudinal direction at a temperature of 100 degrees Celsius. In addition, the sheet is drawn by 5.7 times its length in the transverse direction at a temperature of 150 degrees Celsius. Then the sheet is subjected to a heat treatment thereby yielding a layered structure with an overall thickness of 20 μm for the A layer.

According to another example, the layer composed by polyethylene-2,6-naphthalate is assumed to be the A layer. Polyethylene-2,6-naphthalate contains inert particles of 0.01 to 2 μm in average particle size by 0.001 to 0.5 weight percent. The inert particles may be of silica, alumina, and calcium carbonate, etc. The layer that consists of syndiotacticpolystyrene is assumed to be the B layer. The A layer and the B layer are stacked alternately for at least 11 layers. This laminated material is extended in the direction of one axis. The thickness of the A layer and B the layer is made to be 0.05 to 0.3 μm.

The adhesion of neighboring layer increases due to drawing. A layered structure in which each layer is mutually integrated can be obtained. Moreover, manufacturing a thin film that is 0.05 to 0.3 μm is troublesome in the point of securing the uniformity of the film thickness and physical properties. However, it is advantageous to make it a thin film after stacking. Moreover, the decrease in the manufacturing yield and variability of the characteristics between products can be reduced thereby.

When drawing is performed, there is a resin material that increases or decreases the refractive index. A film material having a index which is increased by drawing and a stacked film material having refractive index which is decreased by drawing are alternately stacked. Then, the difference in the refractive index between adjoined layers increases. Therefore, one of more preferable characteristics is obtained in that material exhibits color shifting. PVC (polyvinyl chloride) is typified as a material in which the refractive index increases by drawing. PMMA (acrylic fiber) is typified as a material to which the refractive index decreases by drawing.

The support body can be composed of polypropylene, polyester, PET, TAC, paper, etc. The color (for instance, red) can be printed on the support body at a level equal with when the multilayer thin film seen from a specific direction (for instance, from the front). Moreover, the film is disposed on the print and is fixed by the adhesive, or by heat transfer. A masking sheet can be composed of metallic foil, plastic sheet, paper, and paint.

Figure 3:
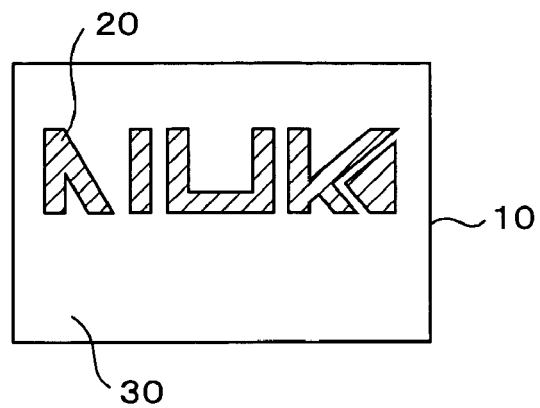
FIG. 3 is a plane view showing the discrimination medium which is partially adhered with the multilayer thin film.

FIG. 3 shows the discrimination medium 10 in which a pattern 20 composed of a multilayer thin film is fixed to the support body 30. When the discrimination medium 10 is observed while the view angle is changed, only the pattern 20 consisting of the multilayer thin film changes into various colors and the color of the support body 30 does not change. Since such change of color makes the pattern 20 conspicuous, it is possible to distinguish counterfeit goods easily.

Moreover, the multilayer thin film may be made of a support body 30 as shown in FIG. 3. A foil such as an aluminum foil can be transferred onto the surface, and form a pattern in parts where the foil is not provided. When viewing this composition while changing the viewing angle, only the patterned 20 parts that consists of the multilayer thin films changes into various colors. The foil color does not change. The existence of the pattern 20 stands out due to this change. Therefore, it is possible to distinguish counterfeit goods easily.

Figure 4:
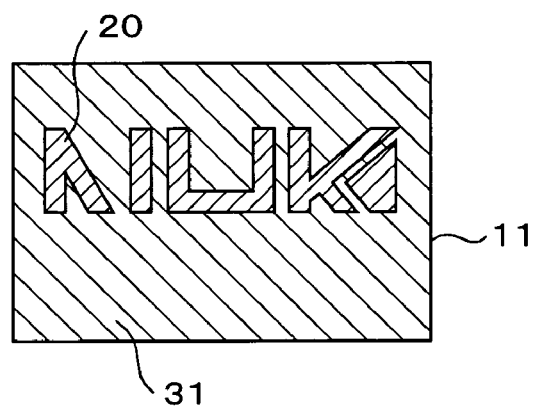
FIG. 4 is a plane view showing the discrimination medium in which a portion thereof is adhered with a multilayer thin film and another portion is printed with a color equivalent to the color of the multilayer thin film when viewed from a specific angle.

Moreover, FIG. 4 shows the discrimination medium 11. Discrimination medium 11 is a transfer of a color foil to discrimination medium 10 (FIG. 3). The transfer is made on the part other than the pattern 20. The color of the foil is a color equal to that when the multilayer thin film is seen from a specific direction. When seeing the discrimination medium 11 from a prescribed direction, the boundary of the foil transcript part 31 and the pattern 20 composed of the multilayer thin film is not clear. Therefore, the pattern is not easily examined visually.

However, the color pattern 20 shifts to the blue side by the color shift when the viewing angle is gradually increase. The difference between the tone of the pattern 20 and the tone of the foil transfer part 31 becomes pronounced. As a result, the pattern (the pattern 20) made by the multilayer thin film can be easily checked visually. It is there by possible to distinguish counterfeit goods easily due to this change.

Figure 5:
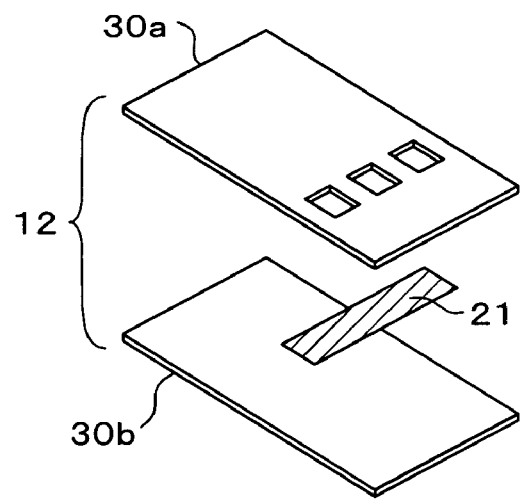
FIG. 5 is an oblique perspective view explaining the condition in which the multilayer thin film which is cut into strips is held between the support body which has openings.

FIG. 5 shows a production process for a discrimination medium 12, in which a multilayer thin films 21 is cut into strips, with the effect that color shifting, are held between two layers of support bodies 30a and 30b.

Figure 6:
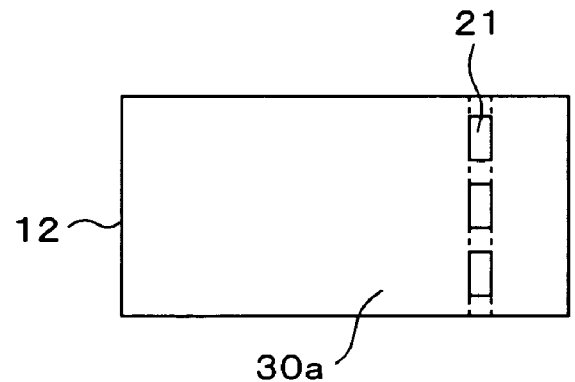
FIG. 6 is a plan view showing the discrimination medium in which the multilayer thin film which is cut into strips is seen from the opening.

FIG. 6 shows the completed discrimination medium 12 made by the production process shown in FIG. 5, in which the multilayer thin films 21 are cut into strips and are partially exposed from the opening formed in the support body 30a. The discrimination medium 12 produced is difficult to peel off from an object without degrading the functions of the discrimination medium and has high anti-counterfeiting effects compared to the embodiment in which chips of the multilayer thin film are adhered. The adhesive may be added to the support body 30b of the obtained discrimination medium 12, which may be a label on which the product number may be printed on the surface. Such a label can be used by adhering it on an optical article as a seal that has the discrimination function.

Figure 11:
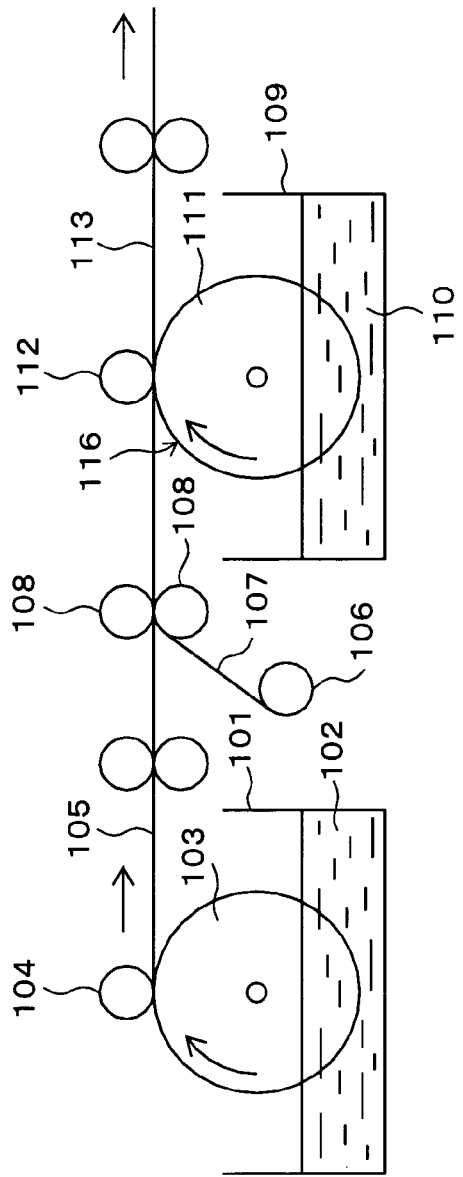
FIG. 11 is a concept chart to show the outline of the device to manufacture the discrimination medium.
Figure 12:
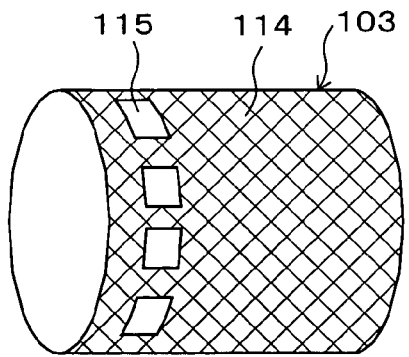
FIG. 12 is an oblique perspective figure who shows the outline of the drum to obtain the paper material.

Hereinafter, an example of a production process of discrimination medium 12 shown in FIG. 5 and FIG. 6 will be explained schematic ally. FIG. 11 is a schematic view showing the outline of the apparatus to produce the discrimination medium. FIG. 12 is an oblique perspective view showing a part of the apparatus shown in FIG. 11. The following components are shown in FIG. 11. Reference numeral 102 is a container which contains slurry 102 as a material for a paper sheet 105 applied to a support body 30a, reference numeral 103 is a body to be drawn soaked into the slurry 102 and supporting it on the surface thereof to make paper. Reference numeral 104 is a guide roller to secure the paper sheet and feed it on, reference numeral 105 is a paper sheet made and fed out. A multilayer thin film 107 is stacked on the paper material 105. A roller 106 rolls the multilayer thin film 107. A couple of guide rollers 108 stack up paper material 105 and the multilayer thin film 107 and applies pressure. A drum 111 laminates another paper material 116 to multilayer thin film 107. Container 109 is filled with the slurry 110. The slurry 110 is the raw material for the paper material 116. The paper material 116 is for making paper on the drum 111. The guide roller 112 applies pressure. The pressure is applied to fix the paper material 116. The paper material 116 is made into paper on the drum 111. Strips 113 of the paper material, the multilayer thin film, and paper material are stacked. Here, the multilayer thin film 107 is a material that exhibits the color shift shown in FIG. 1.

The drum 103 has a net of fine mesh on the surface as shown in FIG. 12. The projections 115 are formed partially on the surface of the drum 103. The slurry adheres to the net material as the drum rotates. As a result, the papermaking is performed. The drum 111 is a structure without the projection 115 in drum 103. In the figure, for ease of description, the structure that projection 115 is formed in the row in the direction of the circumference of drum 103 is shown. However, the width of the drum 103 and the drum 111 is usually 1 m or more. The projection 115 is arrayed in two or more rows in the direction of width.

The drum 103 and the drum 111 are rotated at a predetermined angular speed, and the roll 106 feeds off the multilayer thin film 107 at the same time at a predetermined speed. Therefore, the material 113 is continuously produced. The material 113 is one in which the paper material, the multilayer thin film, and paper material are stacked. Projection 115 is formed on the surface of roll 103. Therefore, paper is not made there. Openings will be formed in paper material 105 at intervals. When the opening is formed in both sides, the projection 115 may be formed on the drum 111.

Figure 13:
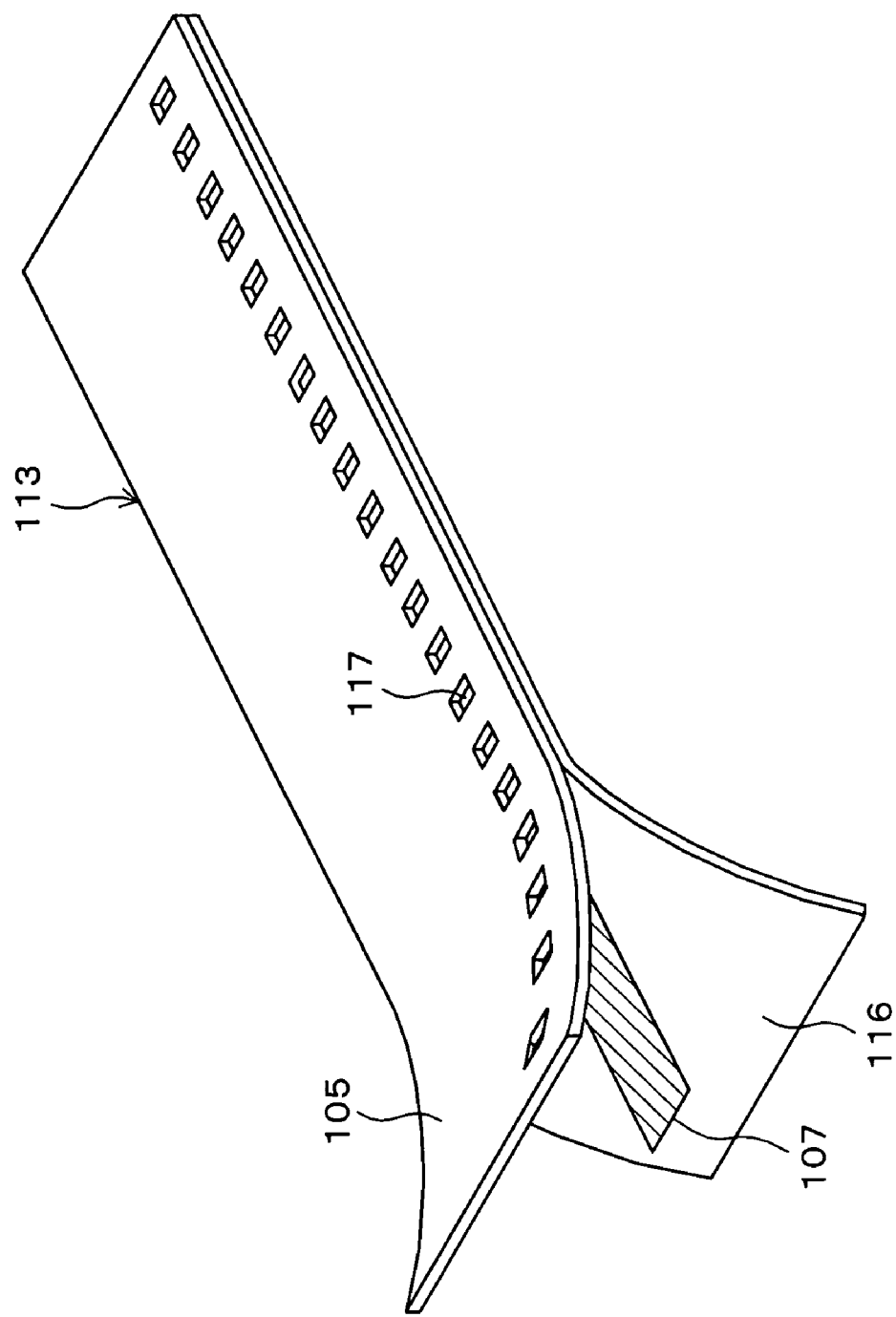
FIG. 13 is an oblique perspective figure who shows the outline of the discrimination medium.

FIG. 13 is an oblique perspective figure who shows the outline of zonal material 113. The zonal material 113 becomes a structure to place multilayer thin film 107 between upper paper material 105 and lower paper materials 116 as shown in FIG. 13.

In the paper material 105, the opening (window) 117 is periodically formed in a straight line. To prevent forming paper an opening 117 is formed in the part of the projection formed on the surface of the drum 103. The multilayer thin film is narrower than the paper material 105 and the paper material 116. To be located in the opening 117, processing that fits the position is performed on the multilayer thin film 107. In a zonal material 113, the multilayer thin film 107 is exposed at the opening 117. The multilayer thin film 107 can be checked visually from the outside through this opening 117. The discrimination medium 12 shown in FIG. 5 and FIG. 6 by cutting the zonal material 113 to a suitable width can be obtained. The width of the multilayer thin film 107 can be widened more than the width in the opening 117. Alternatively, it is possible to narrow it. Alternatively, it is possible to have the same width.

Figure 7:
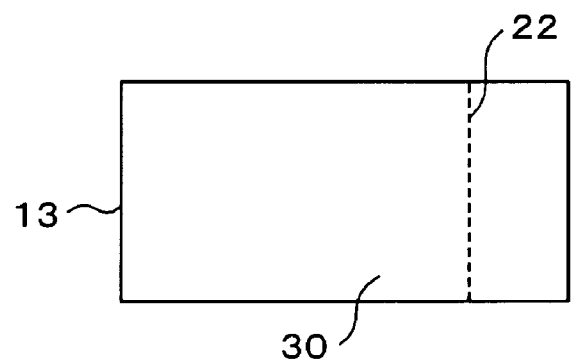
FIG. 7 is a plane view showing the discrimination medium in which the multilayer thin film which is cut into fibers is mixed in paper.

FIG. 7 shows the discrimination medium 13. In this discrimination medium 13, the fiber which is cut out of the multilayer thin film 22 is put into the support body 30 which is made of paper. Such a discrimination medium 13 can be obtained by the process of making paper. In this case, the fiber of the multilayer thin film 22 is put on the position in the stage at which the viscosity increases in the raw material liquid and the making paper process is also continued. In such a discrimination medium 13, the fiber of the multilayer thin film is not exposed at the surface. However, it is possible to see through the outer layer support body 30. Therefore, the phenomenon of the color clearly changing according to the change in the viewing angle can be checked visually.

It is also possible to manufacture discrimination medium 13 of FIG. 7 by using the device shown in FIG. 11. In this case, it only necessary to use the long and slender one of shape as a multilayer thin film 107 and to adjust the thickness of paper material 105 or paper material 116 to suitable thickness.

Figure 8:
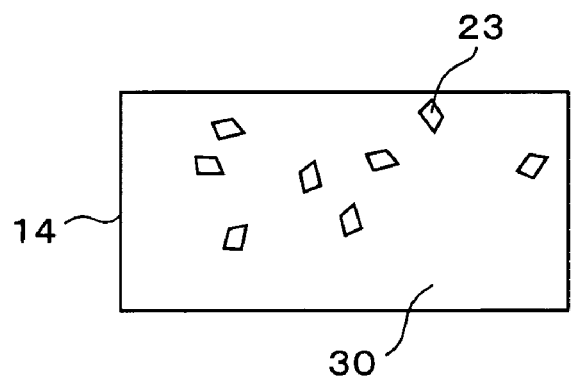
FIG. 8 is a plane view showing the discrimination medium in which the multilayer thin film which is cut into small chips is mixed in paper.

FIG. 8 shows the discrimination medium 14. In this discrimination medium 14, the discrimination sliver 23 which is cut out of the multilayer thin film is put into the support body 30 which is made by paper. The process of manufacture is the same as the one shown in FIG. 7. Moreover, if printing of color on a surface which is a fragment of the multilayer thin film of direction of object is performed, brightness can be increased. For the print, black is preferable. The foil transfer is also possible. An excellent color shift can be observed thereby.

Figure 14:
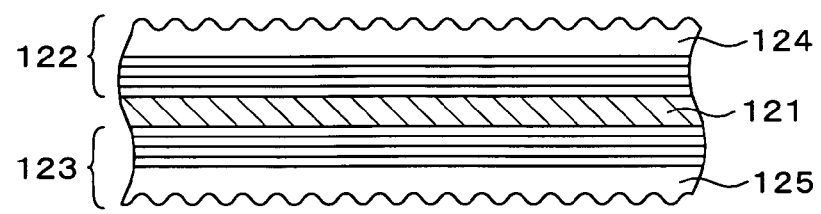
FIG. 14 is a cross section where the outline of the discrimination medium is shown.

In the embodiment shown in FIG. 8, it is preferable to adopt a two-sided structure in the discrimination sliver 23. Here, a two sided structure has the multilayer thin film on both sides of the layer where light is absorbed. This example is explained as follows. FIG. 14 is a cross section where the section structure of the identification medium is shown. In this figure, the layer where light is absorbed is placed between the multilayer thin films.

The identification medium shown in FIG. 14 has multilayer thin film 122 and multilayer thin film 123 on both sides on the layer 121 where light is absorbed. The multilayer thin film shows the color shift in this figure. Furthermore, layer 124 and layer 125 which is performed for embossing finishing are formed on the surface of the multilayer thin film 122 and the multilayer thin film 123.

It explains one example of the process of manufacture of the discrimination medium shown in FIG. 14. First of all, multilayer thin film 122 and multilayer thin film 123 are prepared. Two or more films that show the color shift and the films that can easily be processed by embossing are stacked, and extending and the embossing processing are done, thus multilayer thin film 122 and 123 are made. Next, two multilayer thin films are bonded with the adhesive that mixed black pigments. The layer 121 where light is absorbed is formed with stiffening of this adhesive. The following processing can be given to the layer which is subjected to embossing finishing. The multilayer thin film is drawn. Next, the layer which is subjected to embossing finishing is stacked by spraying, coating, transfer or printing. Next, the embossing finish is given to the layer which is subjected to embossing finish.

Moreover, the embossing finish can be given directly to the multilayer thin film without processing the layer.

It is finely cut after passing through the section structure shown in FIG. 14, and discrimination sliver 23 are obtained. Both sides of discrimination sliver 23 shows the color shift. Therefore, the inside surface and the outside surface can be used. When the manufacturing method for making paper with added small discrimination sliver to the support body is adopted, such a feature is useful.

Figure 15:
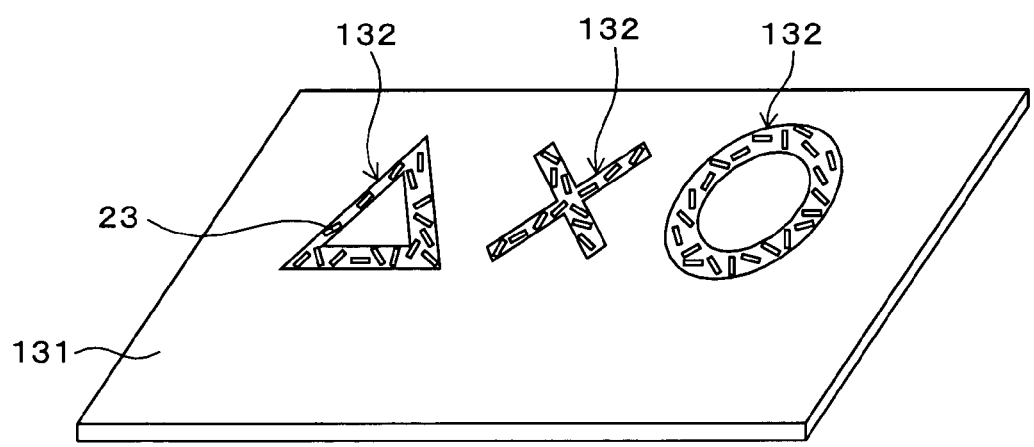
FIG. 15 is an oblique perspective figure who shows the outline of the object that has the discrimination medium.

Hereinafter, other application examples of the discrimination sliver that has the two sided structure shown in FIG. 14 are explained. FIG. 15 is an oblique perspective figure who shows one example of the object used in the identification medium of this invention. Here, the membership card, etc., is specified as the object. In this embodiment, object 131 such as cards has pattern 132 that has the identification function. The pattern 132 is composed of random fixation to the area of predetermined shape of numerous discrimination sliver 23 that shows the section structure in FIG. 14. In this embodiment, the discrimination sliver 23 shows the color shift, and the pattern 132 comes to the surface according on the change in the viewing angle. As a result, it is possible to distinguish.

One example of the method of making the embodiment shown in FIG. 15 is explained. First of all, numerous discrimination slivers 23 that show the section structure in FIG. 14 are prepared. Next, the adhesive is spread or is printed on the surface of the object 131, and shape of the pattern 132 is formed. The discrimination sliver flakes 23 made of numerous small pieces are scattered on the surface of the object 131. Numerous discrimination slivers 23 which are scattered adhere to the pattern 132 by the function of the adhesive. Afterwards, it is lightly press by rollers (not shown in the figure). Other surfaces of the discrimination sliver 23 are made to be parallel to the surface of support body 131. In the structure shown in FIG. 14, this other surface is the layer which is to be processed for embossing finish. Afterwards, the structure that the discrimination sliver scatters is obtained by the adhesive stiffening in the patterned part. According to this production process, discrimination slivers 23 exhibit the color shift on both sides. Therefore, neither the obverse nor the reverse has problems.

Figure 9:
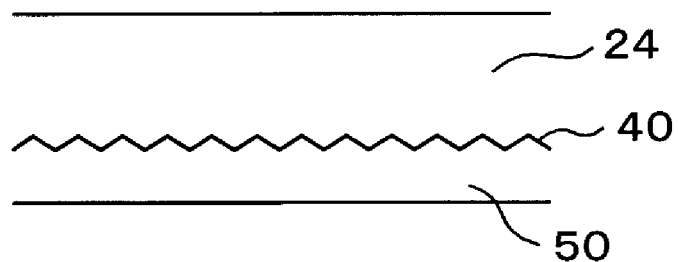
FIG. 9 is a cross section view explaining the condition in which a hologram processing is performed on the multilayer thin film.
Figure 10:
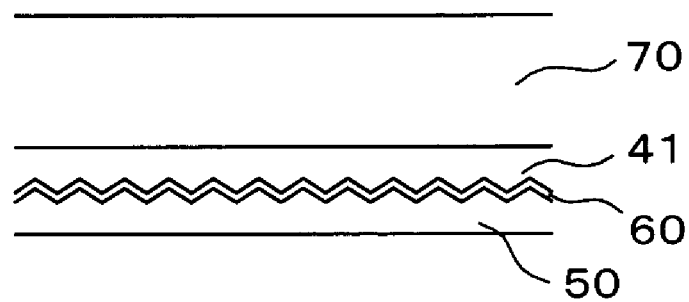
FIG. 10 is a cross section view showing the condition in which the stamping layer for forming a hologram.

Next, the example of combining the multilayer thin film and hologram and an example of combining the multilayer thin film and stamping are explained, while referring to FIG. 9 and FIG. 10 (pasted example). FIG. 10 shows the example of the representative of the seal material of a pasted hologram. In this example, the embossing finish is given to hologram formation layer 41, reflection layer 60 such as aluminum is applied next, and the adhesive material layer 50 is applied the surface facing the object, and, in addition, protective layer 70 such as one of polyethylene terephthalates (PET) applied to the surface.

In contrast, the protective layer and the reflection layer need not be set when the multilayer thin film and the hologram are combined. The protective layer and the reflection layer need not be set when the multilayer thin film and the pressing are combined. In this case as showing FIG. 9, embossing finish 40 is given to multilayer thin film 24 and, in addition, adhesive layer 50 is set on the object side. In addition, to achieve an effect of the color shifting, pigments or dyestuff colored (preferably black) can be mixed with the adhesive layer. Alternatively, the printing colored (preferably black) on the surface on which embossing finish was given is preferable.

Figure 16A:
FIG. 16(A) is a cross section where the state before the hologram processing is given to the multilayer thin film is shown.
Figure 16B:
FIG. 16(B) is a cross section where the state after the hologram processing is given to the multilayer thin film is shown.

Hereinafter, other examples of forming the hologram are explained. FIG. 16 is a cross section where the production process of the multilayer thin film that forms the hologram with the embossing finish is shown. First of all, a film with two kinds of optical penetration with a different refractive index is alternately stacked in multilayer and it is drawn and, the multilayer thin film 142 shown in FIG. 16(A) is obtained. Next, the type that has the embossing finish pattern (With the hologram) not shown in the figure is pushed and, multilayer thin film 143 wit an embossing finish is produced. This figure shows the state in which all layers are transformed. However, the influence in which the processing reaches a part of layer and, the state in which the part of layer is transformed is possible.

When the color shift characteristic is pursued, the embossing finish pattern might not be formed easily. For instance, if the embossing finish pattern is formed, the processed shape is transformed by the elasticity of the material and, the intended embossing finish pattern might become unclear. The number of sheets which piled up of multilayer thin film which are stacked should be many (for instance, hundreds) because it yields a clear color shift. However, the layer shifts when embossing finish is performed, and the intended embossing finish pattern might not be able to be formed.

Figure 17A:
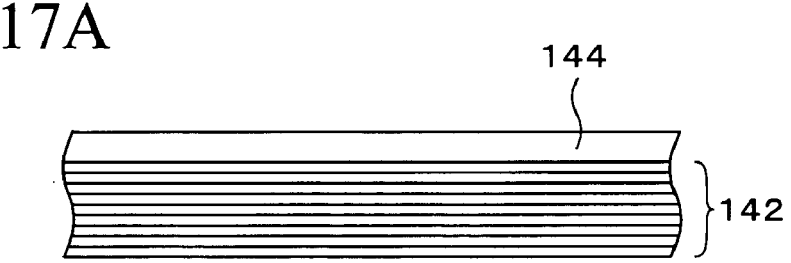
FIG. 17(A) is a cross section before the hologram processing.

An embodiment is explained that can avoid such an inconvenience as follows. FIG. 17 is a cross section where the production process of the multilayer thin film that yields the embossing finish is shown. First of all, the laminated structure that becomes the separation layer of multilayer thin film 142 is obtained. The film of optical penetration that becomes a layer to give the embossing finish to be processed is stacked on the laminated structure. Then, drawing is performed. As a result, both are made to adhere, and it makes it a prescribed thickness.

Here, the multilayer thin film that chiefly color shifts is visible and a film which is visible through the embossing finish is laminated and is obtained. Thermosetting resins such as the unsaturated polyester resin, the acrylic degeneration urethane resin, and the epoxy degeneration acrylic resin can be used as a material of film 144 which is viewable there through.

Next, the embossing finish is given to the transparent film 144 by using the type not shown in the figure to give the embossing finish. Layer 145 that consists of the optically transparent film from which the hologram function is given to be processed is obtained. Optically transparent film 144 can be selected as the material to give the embossing finish easily. Therefore, the embossing finish that composes the hologram is formed into optically transparent film 144 chiefly (FIG. 17 (B)). Hereafter, the process of manufacture that can be adopted is explained. Multilayer thin film 142 is obtained by drawing. Optically transparent film 144 from which the embossing finish is given is laminated by using a coating method etc. thereof. Afterwards, the embossing finish is given. It should be noted that figure is expressed for the influence of the embossing finish to reach only the film of optical penetration that is the layer 142 to be processed. However, influence of the embossing finish is possible to some degree in the multilayer thin film 142.

In this embodiment, the multilayer thin film 142 controls the function of the color shift chiefly. The layer 145 which is processed the function of the hologram chiefly. The layer 145 which is processed can be selected from materials that yield the embossing finish easily. Therefore, the intended hologram can be formed. In this composition, there is the film of suitable material for embossing finish and press processing, there is the multilayer film to cause color shifting, and there is a boundary between the two. The reflection due to the difference of the refractive index occurs at this boundary. Therefore, the film of a suitable material for the embossing finish and press processing can become a part of multilayer thin film 146 that functionally shows the color shift. That is to say, it can be understood that the layer 145 which is processed is part of multilayer thin film 146 that exhibits the color shift. It should be noted that, transparent film (for instance, one of ZnS and $TiO_2$) with electric conduction that touches the layer which is processed can be formed. Here, it is desired to increase the reflection and refraction on the embossing side. Here, as for this transparent film with electric conduction and the layer which is processed, the refractive index is different. Here, the formation method is a deposition etc.

Figure 17B:
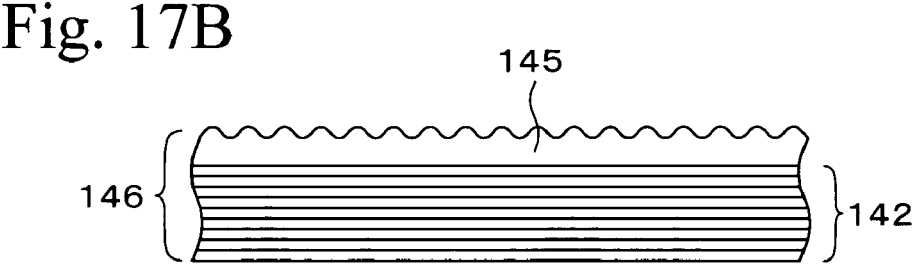
FIG. 17(B) is a cross section after the hologram processing.
Figure 18A:
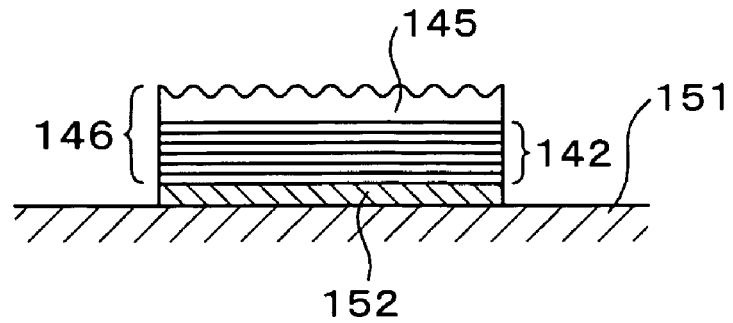
FIG. 18(A) is a cross section where one example of a fixed structure to the object of the multilayer thin film that has the layer where the hologram processing is given to be processed is shown.

Next, the embodiment that fixes the identification medium shown in FIG. 17(B) to the object is explained. FIG. 18 is a cross section where the fixation state to the object of the discrimination medium is shown. The state where the multilayer thin film 146 is pasted on the object 151 with the bonding layer 152 is shown in FIG. 18(A). Here, multilayer thin film 146 contains the layer 145 that is processed. The hologram is formed on the layer 145. In this embodiment, the layer 145 that is processed is located on an uppermost side. The bonding layer 152 functions as a layer where light is absorbed. The bonding layer 152 is a layer where the adhesive with mixed pigments (desirably black) hardened.

Figure 18B:
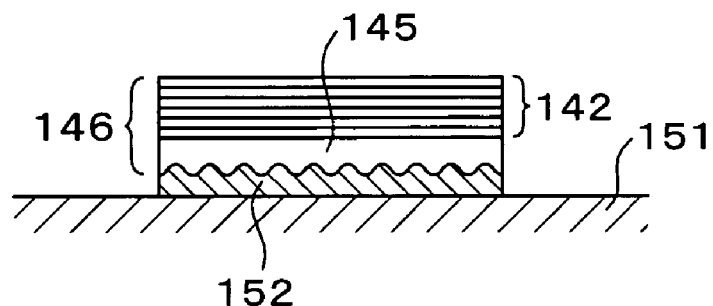
FIG. 18(B) is a cross section where other examples are shown.

FIG. 18(B) shows the layer 145 (layer which is processed) where the hologram was formed, and shows the bonding layer 152 that touched the layer 145 that is processed, and shows the multilayer thin film 146 fixed to the object 151 with the bonding layer 152.

As shown in FIG. 18(B), the layer 145 (layer which is processed) where the hologram is formed can exist on the object 151 sides of the layer 142 where the color shift is shown. However, in view of the side checked visually, the layer (layer which is processed) where the hologram is formed must exist on the side of the layer where light is absorbed.

Figure 19:
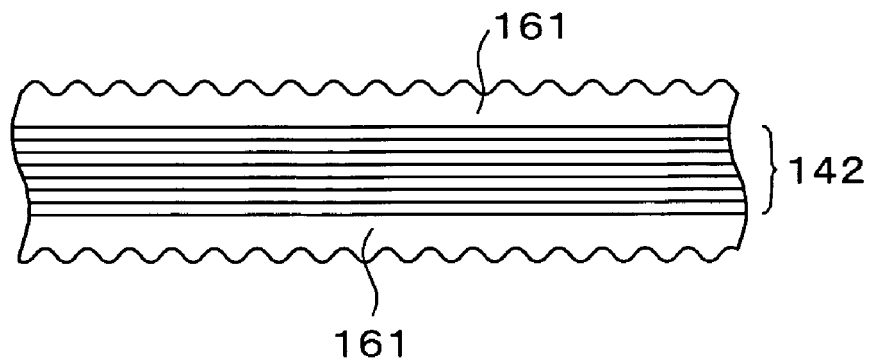
FIG. 19 is a cross section where the structure of the multilayer thin film that has the layer where the hologram processing is given to be processed is shown.

Both sides of the discrimination medium can have the layer (layer which is done processing) where the hologram was formed. FIG. 19 is a cross section where the section structure of other discrimination media is shown. In the structure shown in FIG. 19, both sides of multilayer thin film 142 that shows the color shift have layer 161 (layer which is done processing) where the hologram was formed.

INDUSTRIAL APPLICABILITY

As explained above, in this invention, the multilayer thin film that changes color according to the change in the viewing angle is fixed to a part of the surface of the support body, and the print which is the same color as when the film is seen from a predetermined direction is printed on the part other than the film of the support body. Therefore, the following excellent effect is achieved. That is, it is not possible to easily counterfeit. The discrimination of genuine goods is easy and is certain. The manufacturing cost can be decreased, etc. It is suitable for the discrimination medium that distinguishes a package of goods, passport, card, a note, a bill, a bond certificate, a gift certificate, a picture, and a ticket, and a lottery ticket.

The invention claimed is:

1. A discrimination medium for determining authenticity of an object by providing an optically discriminating mark on the object, the medium comprising:
    a multilayer thin film having light selectivity of reflecting characteristics depending on a viewing angle, and
    a support body where the multilayer thin film is fixed or a masking sheet is fixed to a surface of the multilayer thin film for masking a part of the surface, wherein
    the multilayer thin film comprises a first multilayer thin film, a second multilayer thin film, and an optical absorption layer held between the first multilayer thin film and the second multilayer thin film,
    both sides of the optical absorption layer have light selectivity of reflecting characteristics depending on a viewing angle,
    the multilayer thin film is cut into strips, fibers, or small chips,
    the support body is made of paper, and
    the multilayer thin film is mixed into the support body when the support body was made.

2. The discrimination medium according to claim 1, wherein a portion is formed by printing or foil transfer, and the portion exhibits a color equivalent to the color of the medium which further comprises the multilayer thin film viewed from a specific direction.

3. The discriminating medium according to claim 1, wherein
    the multilayer thin film is subjected to a hologram processing or a press processing.

4. The discrimination medium for discriminating according to claim 1, wherein
    the discrimination medium has an adhesive layer to adhere the medium to the object, and
    the adhesive layer includes a pigment or dye having a color which may be black.

5. The discrimination medium according to claim 1, wherein
    the surface of the discrimination medium facing the object is printed with a color, wherein the color is black.

6. The discrimination medium according to claim 4, wherein
    a fluorescent material layer or a light accumulating material layer is held between a part of the discrimination medium and a part of the adhesive layer or between a part of the discrimination medium and a part of a printed layer.

7. The discrimination medium according to claim 1, the medium further comprises:
    a slit partially formed in the discrimination medium.

8. The discrimination medium according to claim 3, wherein
    the multilayer thin film includes a stamped layer for forming at least one of a hologram and an embossment.

9. The discrimination medium according to claim 8, wherein the stamped layer is made from a material selected from thermosetting resins, ionization radiation hardening resins, and ultraviolet ray hardening resins.

10. The medium for discriminating according to claim 1, wherein the multilayer thin film is obtained by stacking multiple thin films and drawing the stacked films.

* * * * *